US011203452B2

(12) United States Patent
Hamlin et al.

(10) Patent No.: US 11,203,452 B2
(45) Date of Patent: Dec. 21, 2021

(54) SIZE REDUCTION OF MAILERS

(71) Applicant: Sealed Air Corporation (US), Charlotte, NC (US)

(72) Inventors: Christopher C. Hamlin, Worcester, MA (US); Thomas P. Orsini, Sterling, MA (US); Russell T. Christman, Dunstable, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 17/281,616

(22) PCT Filed: Oct. 3, 2019

(86) PCT No.: PCT/US2019/054376
§ 371 (c)(1),
(2) Date: Mar. 31, 2021

(87) PCT Pub. No.: WO2020/072707
PCT Pub. Date: Apr. 9, 2020

(65) Prior Publication Data
US 2021/0309402 A1  Oct. 7, 2021

Related U.S. Application Data

(60) Provisional application No. 62/741,856, filed on Oct. 5, 2018.

(51) Int. Cl.
*B32B 37/00* (2006.01)
*B65B 51/10* (2006.01)
(Continued)

(52) U.S. Cl.
CPC .............. *B65B 51/10* (2013.01); *B29C 65/22* (2013.01); *B29C 65/7459* (2013.01);
(Continued)

(58) Field of Classification Search
USPC .......................................................... 156/64
See application file for complete search history.

(56) References Cited

U.S. PATENT DOCUMENTS 3,413,175 A    11/1968 Rochla
4,071,997 A     2/1978 Gunther et al.
(Continued)

FOREIGN PATENT DOCUMENTS

CN    203004404 U    6/2013
WO    2019200220 A1   10/2019

OTHER PUBLICATIONS

Written Opinion of the International searching authority in PCT/US2019/054376 dated Apr. 9, 2020.

*Primary Examiner* — James D Sells
(74) *Attorney, Agent, or Firm* — Jon M. Isaacson

(57) ABSTRACT

A system includes a forming funnel, a cutting element, and a fusing device. The forming funnel has divergent surfaces arranged to receive a mailer in an insertion direction between the divergent surfaces. The forming funnel includes a slot that constrains the mailer after the mailer is inserted between the divergent surfaces. The cutting element cuts off a portion of the mailer and to forms a cut end of the mailer as the mailer is moved through the slot in a sliding direction. The fusing device applies pressure to an exterior of the cut end of the mailer and applies heat to the cut end of the mailer as the mailer is moved through the slot. The pressure and the heat applied by the fusing device cause portions of the cut end to fuse together to close the mailer.

23 Claims, 10 Drawing Sheets

(51) Int. Cl.

| | |
|---|---|
| *B29C 65/22* | (2006.01) |
| *B29C 65/78* | (2006.01) |
| *B29C 65/00* | (2006.01) |
| *B65B 61/00* | (2006.01) |
| *B65C 9/46* | (2006.01) |
| *B65B 57/00* | (2006.01) |
| *B29C 65/74* | (2006.01) |

(52) U.S. Cl.
CPC ........ *B29C 65/787* (2013.01); *B29C 65/7891* (2013.01); *B29C 66/1122* (2013.01); *B29C 66/43121* (2013.01); *B29C 66/72328* (2013.01); *B29C 66/73921* (2013.01); *B29C 66/81465* (2013.01); *B29C 66/83413* (2013.01); *B29C 66/849* (2013.01); *B65B 57/00* (2013.01); *B65B 61/005* (2013.01); *B65C 9/46* (2013.01); *B29C 2793/0081* (2013.01)

(56) References Cited

U.S. PATENT DOCUMENTS

| | | | |
|---|---|---|---|
| 4,673,325 A | * | 6/1987 | Jago .................. B25J 15/02 |
| | | | 414/798.2 |
| 4,674,268 A | | 6/1987 | Gavronsky et al. |
| 4,832,495 A | | 5/1989 | Briggs et al. |
| 5,734,476 A | | 3/1998 | Dlugos |
| 5,770,864 A | | 6/1998 | Dlugos |
| 5,815,274 A | | 9/1998 | Dlugos |
| 8,131,654 B2 | | 3/2012 | Asano et al. |
| 8,132,728 B2 | | 3/2012 | Dwinell et al. |
| 8,701,978 B2 | | 4/2014 | Perrone et al. |
| 8,726,960 B1 | | 5/2014 | Huang |

* cited by examiner

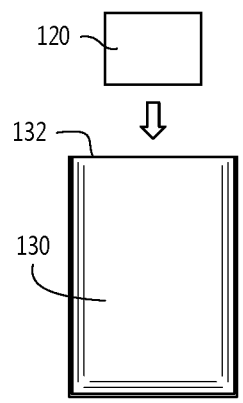 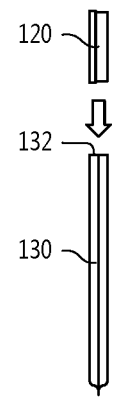
Fig. 2A                Fig. 2B
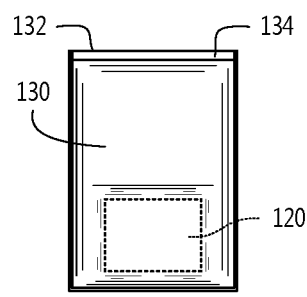 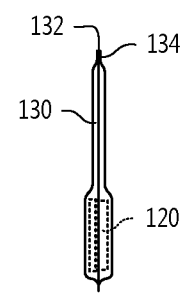
Fig. 2C                Fig. 2D

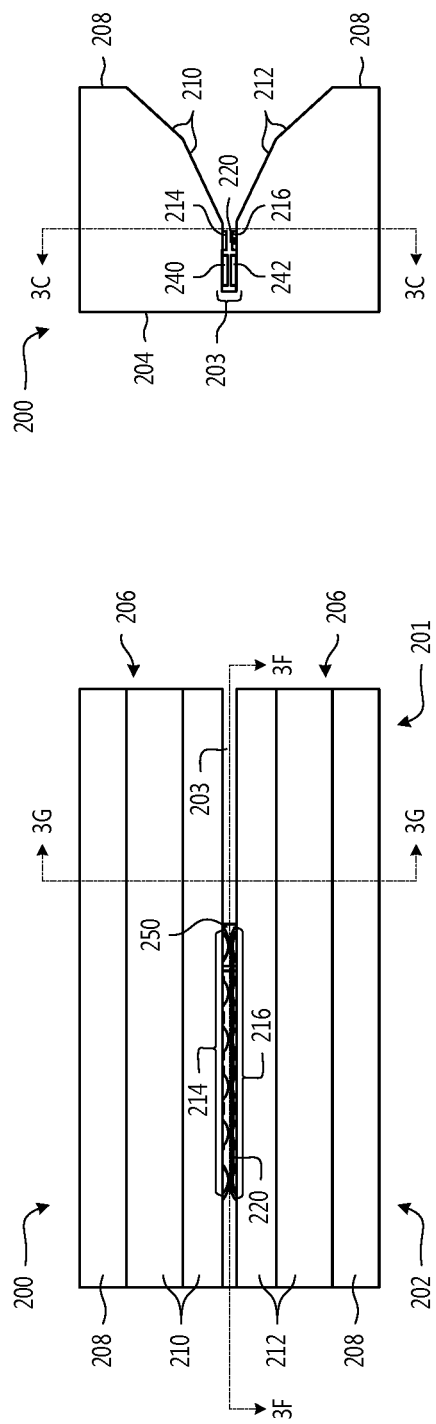
Fig. 3B
Fig. 3A
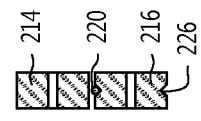
Fig. 3E
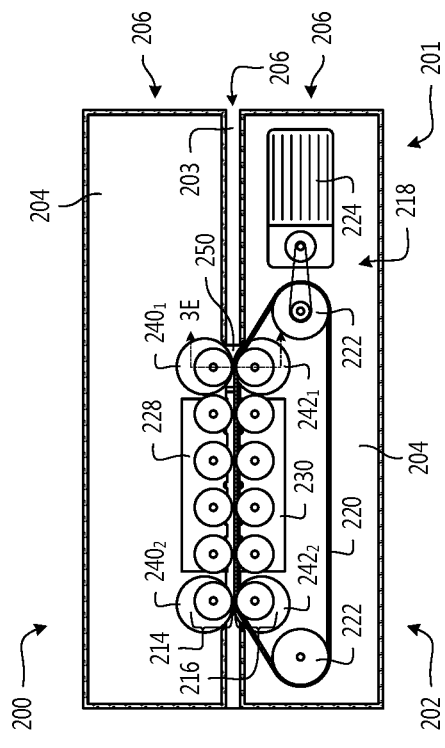
Fig. 3C

SIZE REDUCTION OF MAILERS

BACKGROUND

The present disclosure is in the technical field of filling mailers. More particularly, the present disclosure is directed to systems and methods for closing the openings of cushioned mailers.

A wide variety of objects, including fragile items, are transported in various types of mailing envelopes, sometimes referred to as "mailers." In some cases, these mailers have cushioning to provide some level of protection for the objects transported therein. The outer walls of cushioned mailers are typically formed from protective materials, such as Kraft paper, cardstock, polyethylene-coated paper, other paper-based materials, polyethylene film, or other resilient materials. The inner walls of cushioned mailers are lined with cushioning materials, such as air cellular material (e.g., BUBBLE WRAP™ air cellular material sold by Sealed Air Corporation), foam sheets, or any other cushioning material. The outer walls are typically adhered (e.g., laminated) to the cushioning material when forming the mailers.

When packaging a cushioned mailer, a user typically obtains an empty mailer, retracts a flap to expose an opening of the mailer, inserts one or more objects into the mailer, removes a release liner over an adhesive strip, and then adheres the flap closed to cover the opening. Once the flap is adhered closed, the cushioned mailer can be shipped to a recipient of the one or more objects. Cushioned mailers are convenient because they can be packaged quickly. Also, because the cushioning material is built in to the walls of the cushioned mailer, users to not need significant training to understand how to properly protect the objects inside the cushioned mailers. These efficiencies make cushioned mailers a popular shipping container among mass shippers, such as e-commerce retailers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system includes a forming funnel, a cutting element, and a fusing device. The forming funnel includes divergent surfaces arranged to receive a mailer in an insertion direction between the divergent surfaces. The forming funnel includes a slot configured to constrain the mailer after the mailer is inserted between the divergent surfaces. The cutting element is configured to cut off a portion of the mailer and to form a cut end of the mailer as the mailer is moved through the slot in a sliding direction. The fusing device is configured to apply pressure to an exterior of the cut end of the mailer as the mailer is moved through the slot and to apply heat to the cut end of the mailer as the mailer is moved through the slot. The pressure and the heat applied by the fusing device cause portions of the cut end to fuse together to close the mailer.

In a second embodiment, the first embodiment is arranged such that the insertion direction is substantially perpendicular to the sliding direction.

In a third embodiment, in any of the previous embodiments, the fusing device further includes a first set of rollers and a second set of rollers. The first set of rollers is on a first side of the slot. The first set of rollers is configured to contact a first side of the exterior of the cut end of the mailer as the cut end of the mailer is moved through the slot. The second set of rollers on a second side of the slot. The second set of rollers is configured to contact a second side of the exterior of the cut end of the mailer as the cut end of the mailer is moved through the slot. The first and second sets of rollers are configured to apply the pressure to the exterior of the cut end of the mailer.

In a fourth embodiment, the fusing device of the third embodiment further includes a conveying system configured to convey the cut end of the mailer through the at least a portion of the slot that includes the first and second sets of rollers.

In a fifth embodiment, the conveying system of the fourth embodiment includes a continuous band arranged to pass along the first set of rollers.

In a sixth embodiment, the system fifth embodiment further includes a driving system configured to drive the continuous band.

In a seventh embodiment, the sixth embodiment is arranged such that the mailer is configured to be inserted into the forming funnel manually and moved in the sliding direction manually until the cut end of the mailer reaches the continuous band and the driving of the continuous band moves the mailer in the sliding direction through the first and second sets of rollers.

In an eighth embodiment, any of the third through the seventh embodiments is arranged such that the exterior of the cut end of the mailer include a first ply of paper on the first side of the exterior of the cut end and a second ply of paper on the second side of the exterior of the cut end, and an inner surface of each of the first and second plies of paper has an air cellular material adhered thereto.

In a ninth embodiment, the eighth embodiment is arranged such that the pressure and the heat applied to the cut end of the mailer causes at least a portion of the air cellular material on the first ply of paper to fuse with at least a portion of the air cellular material on the second ply of paper.

In a tenth embodiment, either of the eighth or ninth embodiments is arranged such that the portions of the cut end fused together to close the mailer include a heat seal in the air cellular material on the first and second plies of paper, wherein the heat seal is formed by the pressure and the heat applied by the fusing device.

In an eleventh embodiment, the fusing device of any of the previous embodiments further includes an upper heating element configured to apply heat to an upper side of the cut end of the mailer and a lower heating element configured to apply heat to a lower side of the cut end of the mailer.

In a twelfth embodiment, the fusing device of the eleventh embodiment further includes an upstream set of nip rollers and a downstream set of nip rollers. The upstream set of nip rollers is located upstream of the upper and lower heating elements and the upstream set of nip rollers are configured to apply pressure to the cut end of the mailer before the cut end of the mailer passes between the upper and lower heating elements. The downstream set of nip rollers located downstream of the upper and lower heating elements and the downstream set of nip rollers are configured to apply pressure to the cut end of the mailer after the cut end of the mailer passes between the upper and lower heating elements.

In a thirteenth embodiment, any of the previous embodiments further includes a back cover, where the back cover covers portions of a back of the forming funnel and the back cover does not cover the slot in the forming funnel.

In a fourteenth embodiment, the back cover of the thirteenth embodiment covers portions of the slot in the fusing device.

In a fifteenth embodiment, any of the previous embodiments further includes a labelling mechanism configured to apply a shipping label to the mailer after the portion of the mailer has been cut off by the cutting element.

In a sixteenth embodiment, the shipping label of the fifteenth embodiment includes shipping information based on dimensions of the mailer after the portion of the mailer has been cut off by the cutting element.

In a seventeenth embodiment, a method of preparing a mailer for shipment includes receiving, into a slot of a forming funnel, a mailer that has an object placed therein. The mailer is capable of being inserted through the slot until a size of the object prevents the mailer from being further inserted through the slot. The method further includes cutting off, by a cutting element as the mailer is slid through the slot in a sliding direction, a portion of the mailer to form a trimmed mailer having a cut end. The method further includes closing, by a fusing device, the cut end of the trimmed mailer as the trimmed mailer is further slid through the slot in the sliding direction and identifying, by a computing device, one or more dimensions of the trimmed mailer. The method further includes determining, by a computing device, shipping information for the trimmed mailer, wherein the shipping information is determined based on the identified one or more dimensions of the trimmed mailer and printing or applying, by a labelling mechanism, the shipping information on the trimmed mailer.

In an eighteenth embodiment, the method of the seventeenth embodiment further includes scanning, by a scanning device, an identifier of a packing list and identifying, by the computing device, a weight of the objected based on the identifier of the packing list.

In a nineteenth embodiment, the method of the eighteenth embodiment further includes scanning, by a scanning device, an identifier of a mailer type of the mailer, identifying, by the computing device, a density of the mailer based the identifier of the packing list, and calculating a weight of the trimmed mailer based on the density of the mailer and the identified one or more dimensions of the trimmed mailer.

In a twentieth embodiment, the method of the nineteenth embodiment further includes calculating, by the computing device, a weight of a package that includes the object and the trimmed mailer based on the weight of the object and the weight of the trimmed mailer.

In a twenty first embodiment, the method of the twentieth embodiment further includes sensing, by a dimension sensor, a height of the trimmed mailer and calculating, by the computing device, total dimensions of the trimmed mailer based on the sensed height of the trimmed mailer and the identified one or more dimensions of the trimmed mailer.

In a twenty second embodiment, the method of the twenty first embodiment further includes calculating, by the computing device, a dim weight of the trimmed mailer based on the total dimensions of the trimmed mailer.

In a twenty third embodiment, determining the shipping information in the twenty second embodiment includes comparing the weight of the package to the dim weight of the trimmed mailer.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 2A to 2D depict an embodiment of the packaging an object in a cushioned mailer using a forming funnel and a fusing device, in accordance with the embodiments disclosed herein;

FIGS. 3A, 3B, 3C, and 3D depict front, side, cross-sectional front, and back views, respectively, of a system that includes a forming funnel and a fusing device, in accordance with the embodiments disclosed herein;

FIGS. 3E, 3F, and 3G depict portions of the system from FIGS. 3A to 3D, including, respectively, a cross-sectional view of a component of the system, a cross-sectional top view of the system, and a cross-sectional side view of the system, in accordance with the embodiments disclosed herein;

DETAILED DESCRIPTION

The present disclosure describes embodiments of systems and methods for reducing dimensional weight (or dim weight) of packages. In some embodiments, a system for reducing the size of a mailer and closing the mailer includes a forming funnel, a cutting element, and a fusing device. The forming funnel has divergent surfaces arranged to receive a mailer in an insertion direction between the divergent surfaces. The forming funnel includes a slot that constrains the mailer after the mailer is inserted between the divergent surfaces. The cutting element cuts off a portion of the mailer and to forms a cut end of the mailer as the mailer is moved through the slot in a sliding direction. The fusing device applies pressure to an exterior of the cut end of the mailer and applies heat to the cut end of the mailer as the mailer is moved through the slot. The pressure and the heat applied by the fusing device cause portions of the cut end to fuse together to close the mailer.

In some embodiments disclosed herein, methods of preparing a mailer for shipment include a mailer that has an object placed therein being received into a slot of a forming funnel. The mailer is capable of being inserted through the slot until a size of the object prevents the mailer from being further inserted through the slot. A portion of the mailer is cut off by a cutting element, as the mailer is slid through the slot in a sliding direction, to form a trimmed mailer having a cut end. The cut end of the trimmed mailer is closed by a fusing device as the trimmed mailer is further slid through the slot in the sliding direction. One or more dimensions of the trimmed mailer are identified by a computing device. Shipping information for the trimmed mailer is determined by a computing device. The shipping information is determined based on the identified one or more dimensions of the trimmed mailer. The shipping information is printed or applied on the trimmed mailer by a labelling mechanism.

Figure 1A:
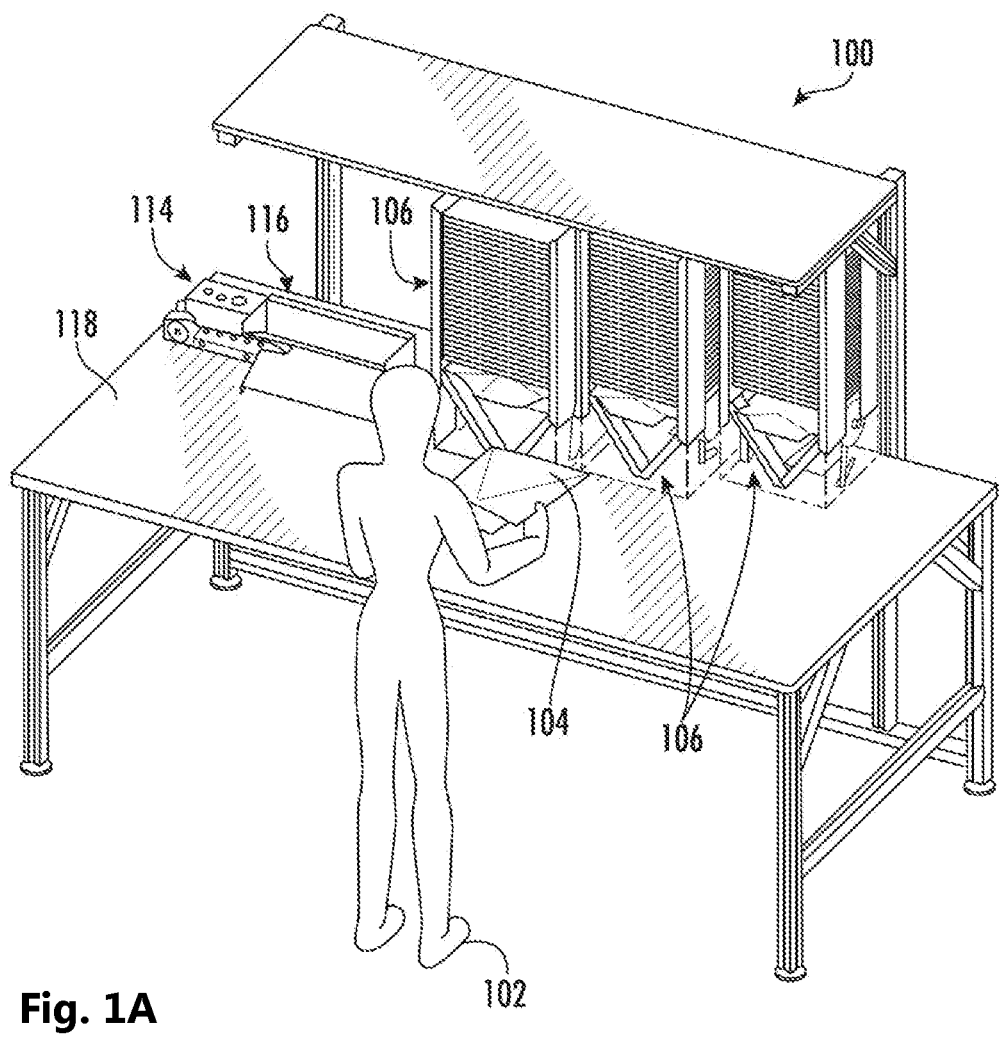
FIG. 1A depicts a packaging station at which a user can fill and close a cushioned mailer that does not have a closure flap, adhesive, or a release liner, in accordance with the embodiments disclosed herein.

Depicted in FIG. 1A is a packaging station 100 at which a user 102 can fill and close a cushioned mailer 104 that does not have a closure flap, adhesive, or a release liner. In the depicted embodiment, the user 102 selected the cushioned mailer 104 from one of a number of supplies 106 of cushioned mailers. In the depicted embodiment, each of the supplies 106 contains cushioned mailers that have a different size (e.g., a different width and/or a different length) than the other of the supplies 106 of cushioned mailers. In some cases, the user 102 may have selected the cushioned mailer 104 from one of the supplies 106 based on a size of an object to be inserted into the cushioned mailer 104.

Figure 1B:
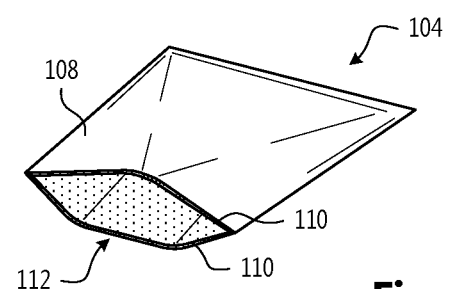
FIG. 1B depicts the cushioned mailer from FIG. 1A in greater detail, in accordance with the embodiments disclosed herein.

The cushioned mailer 104 is depicted in greater detail in FIG. 1B. The cushioned mailer 104 includes an outer material 108. In some embodiments, the outer material 108 includes one or more of Kraft paper, cardstock, polyethylene-coated paper, other paper-based materials, polyethylene film, other plastic-based films, or other any other resilient material. The cushioned mailer 104 also includes a cushioning material 110. In some embodiments, the cushioning material 110 includes one or more of air cellular material (e.g., BUBBLE WRAP™ air cellular material sold by Sealed Air Corporation), foam sheets, or any other cushioning material. In a particular embodiment, the outer material 108 is Kraft paper, the cushioning material 110 is air cellular material, and the air cellular material is laminated to the Kraft paper.

In some embodiments, when the user 102 removes the cushioned mailer 104 from one of the supplies 106, the cushioned mailer 104 has an opening 112 on one side and the other three sides of the cushioned mailer 104 are closed (e.g., sealed or adhered closed). The opening 112 permits the user 102 to insert one or more objects into the cushioned mailer 104. As can be seen in FIG. 1B, the opening 112 of the cushioned mailer 104 does not include a closure flap. The cushioned mailer 104 also does not include an adhesive strip with a release liner to enable a closure flap to be adhered over the opening 112.

Returning back to the packaging station 100 decided in FIG. 1A, the packaging station 100 includes a fusing device 114 that is capable of selectively applying pressure and heat to the opening 112 of the cushioned mailer 104. In some embodiments, the pressure and heat applied by the fusing device 114 cause portions of the opening 112 to fuse together to close the opening 112 of the cushioned mailer 104. In some embodiments, the fusing device 114 is capable of causing the portions of the opening 112 to fuse together to close the opening 112 as the opening of the cushioned mailer 104 is passes through the fusing device 114 in a sliding direction. Additional embodiments of fusing devices are described below and can be used in the packaging station 100 as the fusing device 114.

One difficulty with the used of the fusing device 114 is that the two sides of the opening 112 need to be constrained together before the opening 112 can be inserted into the fusing device 114. The user 102 is capable of constraining the opening 112 in order to insert the opening 112 into the fusing device 114. However, this operation could be time consuming and require skill and training to use.

In order to quickly and easily constrain the opening 112 of the cushioned mailer 104, the packaging station 100 also includes a forming funnel 116. The forming funnel 116 is configured to receive the opening 112 of the mailer as the user inserts the opening 112 into the forming funnel 116. The forming funnel 116 is also configured to constrain the opening 112 after the opening 112 has been inserted into the forming funnel 116. The forming funnel 116 also has an open end proximate the fusing device 114 that allows the user 102 to slide the cushioned mailer 104 in a sliding direction toward the fusing device 114. The forming funnel 116 is configured to continue constraining the opening 112 of the cushioning miler 104 as the cushioned mailer 104 is slid toward the fusing device 114 in the sliding direction. Additional embodiments of forming funnels and fusing devices are described in U.S. Patent Application No. 62/657,198, the contents of which are hereby incorporated by reference in their entirety.

In the depicted embodiment, the packaging station 100 includes a working surface 118 that the user 102 can use when packaging objects in cushioned mailers. In the depicted embodiment, the supplies 106 of the cushioned mailers, the fusing device 114, and the forming funnel 116 are all located on the surface 118. This arrangement may be convenient for the user 102 to be able to stage objects for packaging into the cushioned mailers on the surface 118, select a cushioned mailer 104 from one of the supplies 106, insert one or more objects in the selected cushioned mailer 104, insert the opening 112 of the cushioned mailer 104 into the forming funnel 116, slide the opening 112 of the cushioned mailer 104 through the forming funnel 116 and the fusing device 114. As the opening 112 of the cushioned mailer 104 passes through the fusing device 114, the fusing device 114 causes portions of the opening 112 to fuse together to close the opening 112 of the cushioned mailer 104. In this way, the fusing device 114 and the forming funnel 116 assist in the manual closing of the opening 112 of the cushioned mailer 104.

Depicted in FIGS. 2A to 2D are an embodiment of the packaging an object 120 in a cushioned mailer 130 using a forming funnel and a fusing device described in U.S. Patent Application No. 62/657,198. FIGS. 2A and 2B depict front and side views of a first instance of the object 120 and the cushioned mailer 130. In the first instance shown in FIGS. 2A and 2B, the object 120 is located outside of the cushioned mailer 130 near an opening 132 of the cushioned mailer 130. From the first instance shown in FIGS. 2A and 2B, the object 120 can be inserted into the cushioned mailer 130 through the opening 132 in the direction of the arrows in FIGS. 2A and 2B.

FIGS. 2C and 2D depict front and side views of a second instance of the object 120 and the cushioned mailer 130. In the second instance shown in FIGS. 2C and 2D, the object 120 is located inside of the cushioned mailer 130. The opening 132 of the cushioned mailer 130 has been closed. For example, after the object 120 was inside of the cushioned mailer 130, the opening 132 of the cushioned mailer could have been inserted into the forming funnel 116 to constrain the opening 132 and the cushioned mailer 130 could have been slid through the fusing device 114 to cause the opening 132 of the cushioned mailer 130 to be closed.

The use of cushioned mailers using a forming funnel and a fusing device can decrease the amount of time to package objects. For example, the size of the cushioned mailers can be selected so that objects of many different sizes can be packaged in the cushioned mailers. The ability to quickly close the cushioned mailers using a forming funnel and a fusing device allows for a minimal amount of time for a packer to package objects of different sizes. However, there are drawbacks to this system. In one example, as shown in FIG. 2C, after the opening 132 is closed, the size of the cushioned mailer 130 is bigger (e.g., taller) than necessary to package the object 120. A smaller cushioned mailer could have been used, but the time to find a smaller cushioned mailer may not be worth the cost of simply using the same size cushioned mailer (e.g., cushioned mailer 130) to package all objects.

An over-sized package may not be desirable for a number of reasons. In another example, the cushioned mailer 130 may be difficult to handle under certain conditions because the object 120 is not centered within the cushioned mailer 130, thus making the cushioned mailer 130 feel unbalanced to someone who is handling the cushioned mailer 130. In another example, the cost to ship the cushioned mailer 130 may be greater than the cost to ship the object 120 in a cushioned mailer that is smaller than the cushioned mailer 130. This lower shipping cost of a smaller mailer may be due to the pricing technique used by shipping carriers called dimensional weight (or "dim weight") pricing. In dim weigh pricing, a carrier typically calculates the shipping cost based on the overall dimensions (e.g., height, width, and thickness) of the container being shipped. In some cases, particularly with low weight packages, the carrier sets a minimum density and charges for shipping as a function of the overall dimensions and the minimum density. For example, if the height, width, and thickness of the cushioned mailer 130 were 12 inches, 9 inches, and 2 inches, respectively, and the minimum density was 1 pound per 108 cubic inches, then the dim weight for the cushioned mailer 130 would be 2 pounds. If the weight of the object 120 and the cushioned mailer 130 was less than 2 pounds, the carrier would still charge for shipping at the dim weight rate for a 2-pound package. However, if the size of the cushioned mailer 130 was reduced, the dim weight could be less than 2 pounds, resulting in lower shipping charges for the object 120.

It would be advantageous to have a system that allows for objects of various sizes to be packaged in a standard-sized cushioned mailer to reduce packaging time by a packer. It is also advantageous to have the finished size of the cushioned mailer as close to the size of each object as possible to avoid shipping costs due to dim weight rates. Disclosed herein are embodiments of systems that include forming funnels to reduce the amount of time to close standard-sized cushioned mailers for and that reduce the size of the finished package to void excess dim weight charges.

Figure 3F:
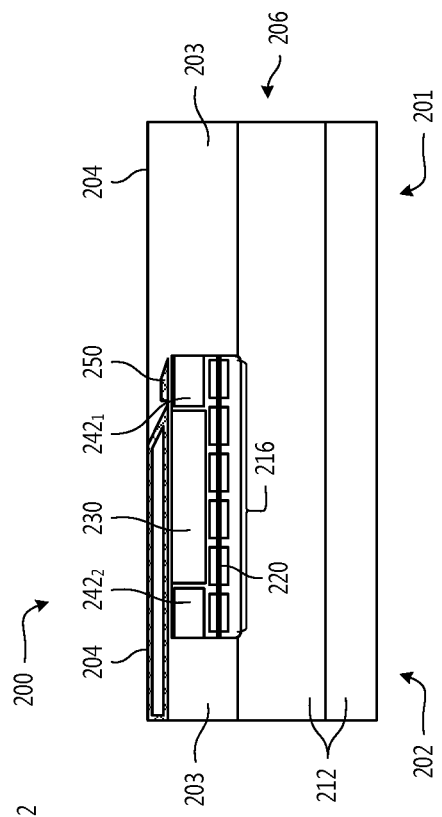
Figure 3D:
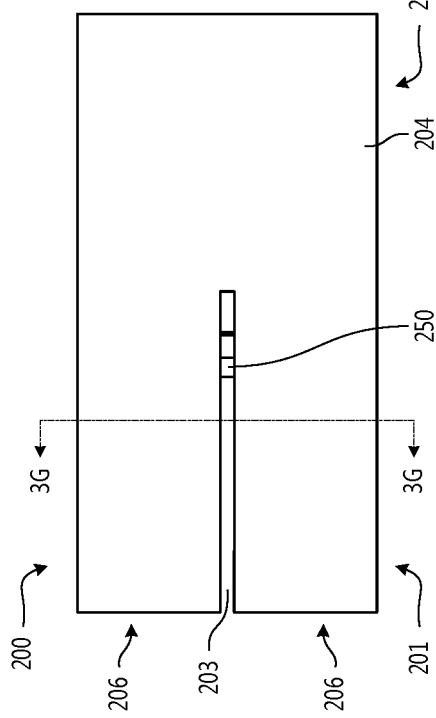
Figure 3G:
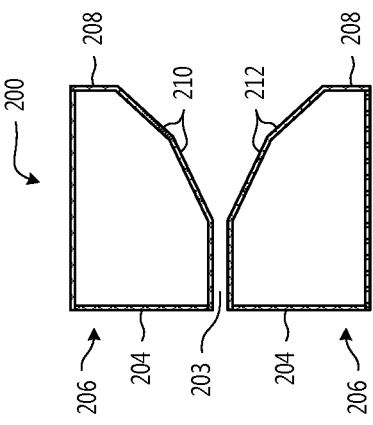

Depicted in FIGS. 3A, 3B, 3C, and 3D are front, side, cross-sectional front, and back views, respectively, of a system 200 that includes a forming funnel 201 and a fusing device 202. The system 200 can be used in place of the forming funnel 116 and the fusing device 114 in the packaging station 100. While the system 200 is depicted as a single apparatus in FIGS. 3A to 3D, it will be apparent that the forming funnel 201 and the fusing device 202 could be two separate apparatuses (e.g., just as the forming funnel 116 and the fusing device 114 are separate apparatuses in FIG. 1A). Portions of the system 200 are also shown in FIGS. 3E, 3F, and 3G, which depict, respectively, a cross-sectional view of a component of the system 200, a cross-sectional top view of the system 200, and a cross-sectional side view of the system 200.

The system 200 includes a slot 203 that passes through the forming funnel 201 and the fusing device 202. The opening of a cushioned mailer can be slid in a sliding direction. The slot 203 is arranged so that the opening of a cushioned mailer is constrained when it is in the slot 203. As used herein when referring to the openings of cushioned mailers, the term "constrained" includes a condition where at least one of the two sides of the opening is deflected from a position that is different from its natural resting position. In one example, when an opening of a cushioned mailer is constrained in the slot 203, the slot 203 deflects one or both sides of the opening to be closer together than they would be if the sides were in their natural resting position.

The system has a back cover 204 that covers most of the back of the system 200. As can be seen in FIG. 3D, the back cover 204 does not cover the back of the slot 203 of the forming funnel 201 but the back cover 204 does cover the back of the slot 203 in portions of the fusing device 202. Because the back cover 204 does not cover the slot 203 in the forming funnel 201, the forming funnel 201 has cantilevered ends 206.

In the depicted embodiment, the slot 203 is recessed back from front surfaces 208 of the system 200. Between the slot 203 and the front surfaces 208, the system 200 includes an upper divergent surface 210 and a lower divergent surface 212. In the depicted embodiment, each of the upper and lower divergent surfaces 210 and 212 includes two distinct planar surfaces. Each of the surfaces depicted in the upper and lower divergent surfaces 210 and 212 is not parallel to the horizontal surfaces of the slot 203, not parallel to the front surfaces 208, and not parallel to the other surfaces of the upper and lower divergent surfaces 210 and 212. In other embodiments, each of the upper and lower divergent surfaces 210 and 212 may include a single planar surface, any other number of planar surfaces, a contoured surface, any other surface, or any combination thereof. The upper and lower divergent surfaces 210 and 212 allow the slot 203 to be relatively narrow to constrain the sides of the opening of a cushioned mailer together while other portions of the mailer may be thicker than the slot 203 (e.g., the portion of the mailer that is thicker because an object has been inserted into the mailer).

The fusing device 202 is configured to apply pressure to an exterior of the opening of the mailer as the opening of the mailer is moved through the slot 203 in a sliding direction (e.g., from right to left when viewing the system 200 in FIG. 3A). In some embodiments, the insertion direction is substantially perpendicular to the sliding direction. In the depicted embodiment, the fusing device 202 includes an upper set of rollers 214 that extend into the slot 203. The upper set of rollers 214 is arranged to contact a top side of the exterior of the opening of the mailer as the opening is moved through the slot 203. The fusing device 202 also includes a lower set of rollers 216 that extend into the slot 203. The lower set of rollers 216 is arranged to contact a bottom side of the exterior of the opening of the mailer as the opening is moved through the slot 203. The top and bottom sets of rollers 214 and 216 pinch the opening of the mailer by exerting a pressure on the exterior of both sides of the opening of the mailer. In some embodiments, the respective locations of the top and bottom sets of rollers 214 and 216 may be selected based on one or more of an amount of pressure to be applied to the opening of the mailer, any other operating condition of the fusing device 202, an expected width of the mailer, any other characteristic of the mailer, or any combination thereof. In the depicted embodiment, portions of the top and bottom sets of rollers 214 and 216 extend into the slot 203 to apply pressure to and further constrain the opening of the mailer.

In the depicted embodiment, the fusing device 202 also includes nip rollers that are configured to apply pressure to an exterior of the opening of the mailer. More particularly, the fusing device 202 includes an upstream upper nip roller $240_1$ and an upstream lower nip roller $242_1$ that form an upstream set of nip rollers and the fusing device 202 includes a downstream upper nip roller $240_2$ and a downstream lower nip roller $242_2$ that form a downstream set of nip rollers. In the depicted embodiment, the upstream upper and lower nip rollers $240_1$ and $242_1$ are located upstream of heating elements (e.g., heating elements 228 and 230, which are discussed in greater detail below) and the downstream upper and lower nip rollers $240_2$ and $242_2$ are located downstream of the heating elements (e.g., heating elements 228 and 230). In some embodiments, the upstream upper and lower nip rollers $240_1$ and $242_1$ are configured to constrain the opening of the mailer before the mailer reaches the heating elements. In the case where the mailer is a cushioned mailer that has air cellular cushioning material, the upstream upper and lower nip rollers $240_1$ and $242_1$ may be configured to apply sufficient pressure to rupture inflated cells of the air cellular material in the opening of the mailer. In some embodiments, the downstream upper and lower nip rollers $240_2$ and $242_2$ are configured to apply pressure to the opening of the mailer after the opening of the mailer has been heated by the heating elements. In the case where the mailer is a cushioned mailer that has ruptured air cellular cushioning material at the opening, the heat from the heating elements may have melted and/or softened the ruptured air cellular cushioning material and the pressure from the downstream upper and lower nip rollers $240_2$ and $242_2$ may cause the melted and/or softened ruptured air cellular cushioning material to solidify together to form a seal.

In the depicted embodiment, the fusing device 202 also includes a conveying system 218. The conveying system 218 is arranged to convey the opening of the mailer through at least the portion of the slot 203 that includes the top and bottom sets of rollers 214 and 216. In the depicted embodiment, the conveying system 218 includes a continuous band 220 that passes along the lower set of rollers 216. The continuous band 220 also passes along guide rollers 222. In the depicted embodiment, the conveying system 218 includes a driving mechanism 224 (e.g., an electric motor) configured to selectively drive one of the guide rollers 222. The driving of the one of the guide rollers 222 by the driving mechanism 224 may cause rotation of the one of the guide rollers 222 and corresponding rotation of the continuous band 220. In some cases, the operation of the driving mechanism 224 is controlled by a computing device (not shown), such as a controller, to control movement of the continuous band 220. In some embodiments, when a user brings the opening of the mailer into contact with the continuous band 220 of the conveying system 218, the continuous band 220 will convey the opening of the mailer through the portion of the slot 203 that includes the top and bottom sets of rollers 214 and 216.

A cross-sectional view of the continuous band and one of the rollers from each of the top and bottom sets of rollers 214 and 216 is shown in FIG. 3E. As can be seen in FIG. 3E, the depicted embodiment of the continuous band 220 has a circular cross section. In other embodiments, the continuous band 220 can have a rectangular cross section, a triangular cross-section, or any other shape cross section. In the depicted embodiment, the rollers in the bottom set of rollers 216 have a groove 226 in which the continuous band 220 is located. The groove 226 may aid in alignment of the continuous band 220 with respect to the rollers in the bottom set of rollers 216. In the depicted embodiment, the groove 226 has a V-shaped cross section. In other embodiments, the groove 226 may have a rectangular cross section, a semi-circular cross section, or any other shape cross section. In some embodiments, the continuous band 220 is made from an elastomeric material, such as an elastic polymer material or a rubber material.

The fusing device 202 is also configured to apply heat to the opening of the mailer as the opening of the mailer is moved through the slot 203 in the sliding direction. In the depicted embodiment, the fusing device 202 includes an upper heating element 228 and a lower heating element 230. The upper heating element 228 is configured to directed heat downward toward the slot 203 and the lower heating element 230 is configured to direct heat upward toward the slot 203. In other embodiments, the fusing device 202 may include only one of the upper and lower heating elements 228 and 230. In some embodiments, the upper and lower heating elements 228 and 230 may be controlled based on a sensed temperature. For example, the fusing device 202 may include a temperature sensor, such as a thermocouple, a thermistor, or any other temperature sensor. The temperature sensor may detect a temperature of the fusing device 202, such as a temperature in the slot 203 near one of the top and bottom sets of rollers 214 and 216. A computing device (not shown), such as a controller, may be configured to receive signals indicative of the temperature from the temperature sensor and control operation of the upper and lower heating elements 228 and 230 based on the signals received from the temperature sensor. In some examples, the computing device can control the upper and lower heating elements 228 and 230 so that the measured temperature is at a target temperature (e.g., at 200° C., at 240° C., etc.), within a range of temperatures around a target temperature (e.g., a range of ±5° C. of 200° C., a range of ±10° C. of 240° C., etc.), or within a range of temperature (e.g., between about 200° C. and about 240° C.). In some embodiments, the upper and lower heating elements 228 and 230 include electrically-resistive heating wires that generate heat in response to electrical current passing through the heating wires. In some embodiments, the upper and lower heating elements 228 and 230 include fans or other blowing devices configured to direct a gas (e.g., air) over the heating wires and toward the slot 203.

As the opening of a mailer passes through the slot 203, the fusing device 202 causes portions of the opening to fuse together to close the mailer. In a non-limiting example, both sides of the cushioned mailer have a Kraft paper exterior that is laminated to an air cellular material that is made from a polyethylene-based film. As the opening of the mailer is passed through the slot 203 of the fusing device 202, the fusing device 202 applies pressure to the exterior of the opening of the cushioned mailer (e.g., pressure due to the position of the top and bottom sets of rollers 214) and the fusing device 202 applied heat to the opening of the cushioned mailer. The pressure and heat applied by the fusing device 202 cause the air cellular material to soften or melt and the air cellular material from the two sides of the opening to fuse together. This function forms a heat seal that fuses the two sides of the opening together. The fused portions may completely close the opening of the mailer (e.g., the heat seal extends across the entire opening) or partially close the opening (e.g., the heat seal extends across portions of the opening without extended completely across the opening). In this way, the fusing device 202 causes portions of the opening to fuse together to either partially or fully close the mailer.

The system 200 also include a cutting element 250. The cutting element 250 configured to cut a portion of the mailer as the mailer is slid through the slot 203 in the sliding direction. As can be seen in FIGS. 3D and 3F, in the depicted embodiment, the cutting element 250 is located in a portion of the slot 203 that is not covered by the back cover 204. In the depicted embodiment, the cutting element 250 is a static blade. In other embodiments, the cutting element can be one or more of a reciprocating blade, a rotating blade, a heated blade, a laser cutter, a water jet, or any other element capable of cutting the mailer. In some embodiments, the cutting element 250 is configured to cut a portion of the mailer to reduce the size of the mailer as the mailer is slid through the slot 203. An example of the cutting element 250 reducing the size of the cushioned mailer 130 is shown in FIGS. 4A to 4D.

Figure 4A:
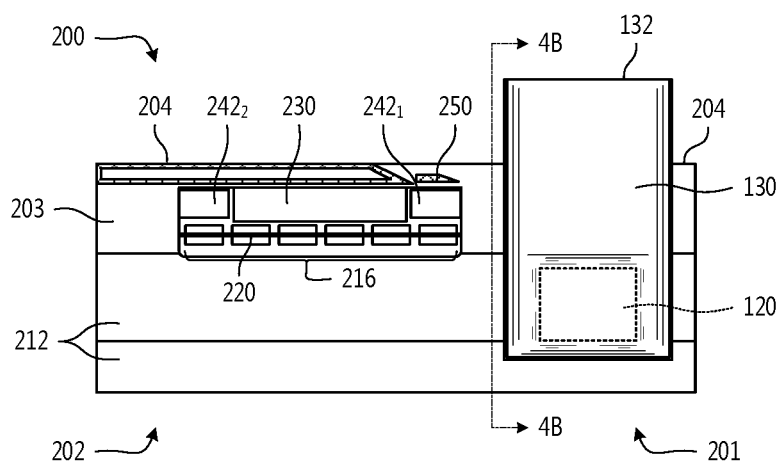
FIGS. 4A to 4D depict an embodiment of the use of a cutting element to reduce the size of a cushioned mailer, in accordance with the embodiments disclosed herein.
Figure 4B:
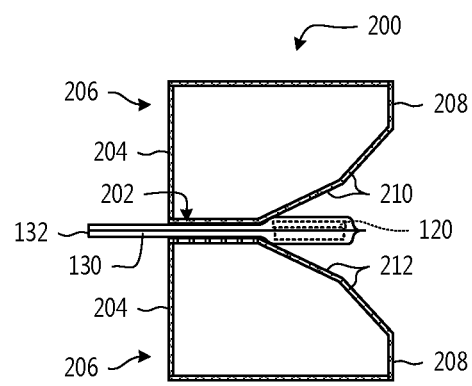

FIGS. 4A and 4B depict cross-sectional top and cross-sectional side views, respectively, of a first instance of an embodiment of the system 200 reducing the size of the cushioned mailer 130 and closing the reduced-sized mailer. In FIGS. 4A and 4B, the opening 132 of the cushioned mailer 130 has been inserted through the forming funnel 201 such that the opening 132 of the cushioned mailer 130 is beyond the back cover 204 of the system 200. The cushioned mailer 130 was inserted into the forming funnel 201 in an insertion direction (e.g., bottom to top in the view in FIG. 4A and right to left in the view in FIG. 4B). As the cushioned mailer 130 was inserted into the forming funnel 201 in the insertion direction, the opening 132 of the cushioned mailer 130 was oriented toward the forming funnel 201 such that at least one side of the opening 132 of the cushioned mailer 130 contacted at least one of the upper and lower divergent surfaces 210 and 212 to constrain the opening 132. The cushioned mailer 130 was moved further in the insertion direction until the cushioned mailer 130 was in the position shown in FIGS. 4A and 4B. At the position shown in FIGS. 4A and 4B, the object 120 presses portions of the cushioned mailer 130 against the upper and lower divergent surfaces 210 and 212 such that the cushioned mailer 130 is prevented from being moved any further in the insertion direction. At this point in the depicted embodiment, the opening 132 of the cushioned mailer 130 is located behind the back cover 204 of the system 200. In other embodiments, the opening 132 of the cushioned mailer 130 may be located in the slot 203 at the point depicted in FIGS. 4A and 4B.

Figure 4C:
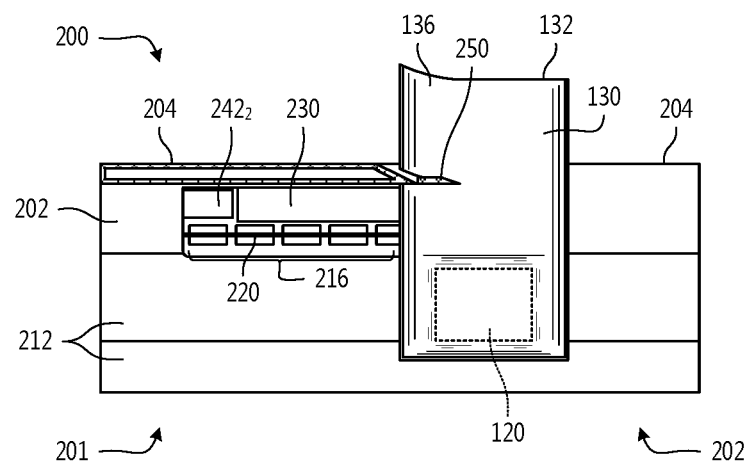

From the instance shown in FIGS. 4A and 4B, the cushioned mailer 130 can be slid in the sliding direction (e.g., from right to left in the depiction shown in FIG. 4A). Depicted in FIG. 4C is a cross-sectional top view of a second instance of the embodiment of the system 200 reducing the size of the cushioned mailer 130 and closing the reduced-sized mailer. From the instance shown in FIGS. 4A and 4B to the instance shown in FIG. 4C, the cushioned mailer 130 has been moved in the sliding direction. The cushioned mailer 130 has come in contact with the cutting element 250, which has started cutting off a portion of the cushioned mailer 130 that includes the opening 132. A portion of the mailer 130 on the front side of the cutting element (e.g., the side of the mailer 130 below the cutting element 250 as seen in FIG. 4C) has entered the fusing device 202. In some embodiments, the upstream upper and lower nip rollers 240₁ and 242₁ have begun rupturing air cellular material in the cushioned mailer 130. In some embodiments, the exterior of the cushioned mailer 130 has been engaged by one or more of the upper and lower sets of rollers 214 and 216 or the continuous band 220, which, in some examples, causes the cushioned mailer 130 to be moved automatically (e.g., without a user exerting a force on the cushioned mailer 130. As can be seen in FIG. 4C, the cutoff portion 136 of the cushioned mailer 130 can flex and move behind the back cover 204 of the system as the cushioned mailer 130 passes further into the fusing device 202.

Figure 4D:
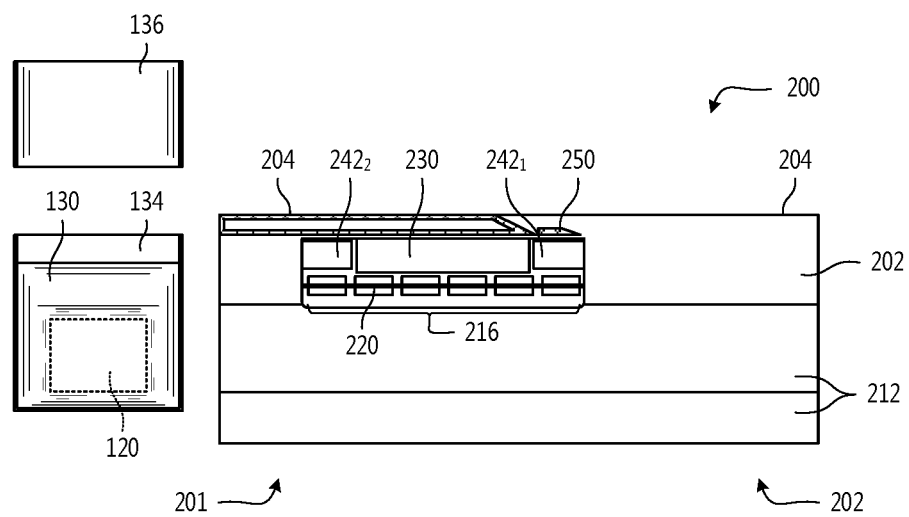

Depicted in FIG. 4D is a cross-sectional top view of a third instance of the embodiment of the system 200 reducing the size of the cushioned mailer 130 and closing the reduced-sized mailer. From the instance shown in FIG. 4C to the instance shown in FIG. 4D, the cushioned mailer 130 has been moved further in the sliding direction until the cushioned mailer 130 has passed completely out of the slot 203. The cutoff portion 136 has been completely cut off from the cushioned mailer 130. The cutoff portion 136 of the cushioned mailer 130 can be disposed of (e.g., recycled) after it has been cut off from the mailer 130. In some embodiments, the system 200 includes a chute, a bin, or another collection device configured to automatically collect portions of cushioned mailers cut off by the cutting element 250.

The pressure and heat applied by the fusing device 202 as the remaining end of the cushioned mailer 130 is moved through the slot 203 cause portions of the remaining end of the cushioned mailer 130 to fuse together to close the cushioned mailer 130. In the depicted embodiment, the heat applied by the fusing device 202 causes some of the air cellular cushioning material to become soft or molten and the pressure applied by the fusing device 202 causes the soft or molten portions of the air cellular cushioning material to fuse together, creating a heat seal 134 that closes the opening 132 of the cushioned mailer 130. In the depicted embodiment, the heat seal 134 extends across the entire remaining end of the cushioned mailer 130. In other embodiments, the heat seal 134 or any other fusing of the remaining end of the cushioned mailer 130 may not extend across the entirety of the remaining end, but portions of the remaining end may be fused to close the remaining end so that the object 120 is not able to be removed from the cushioned mailer 130 without deforming a portion of the cushioned mailer 130.

When comparing the size of the cushioned mailer 130 in FIGS. 2C and 2D to the size of the cushioned mailer 130 in FIG. 4D, it is apparent that the cushioned mailer in FIG. 4D has been reduced in size. The reduction in size in FIG. 4D is due to the cutoff portion 136 having been cut off from the cushioned mailer 130 by the cutting element 250. Thus, the size of the cushioned mailer 130 in FIG. 4D is closer to the size of the object 120 than the size of the cushioned mailer in FIGS. 2C and 2D. The reduced-sized cushioned mailer 130 in FIG. 4D may reduce the dim weight (as therefore the cost of shipping) of the cushioned mailer 130 compared to the dim weight of the cushioned mailer 130 in FIGS. 2C and 2D. The reduced-sized cushioned mailer 130 in FIG. 4D may also be easier to handle (e.g., a packer) because the object 120 is more balanced in the reduced-size cushioned mailer 130.

Figure 5:
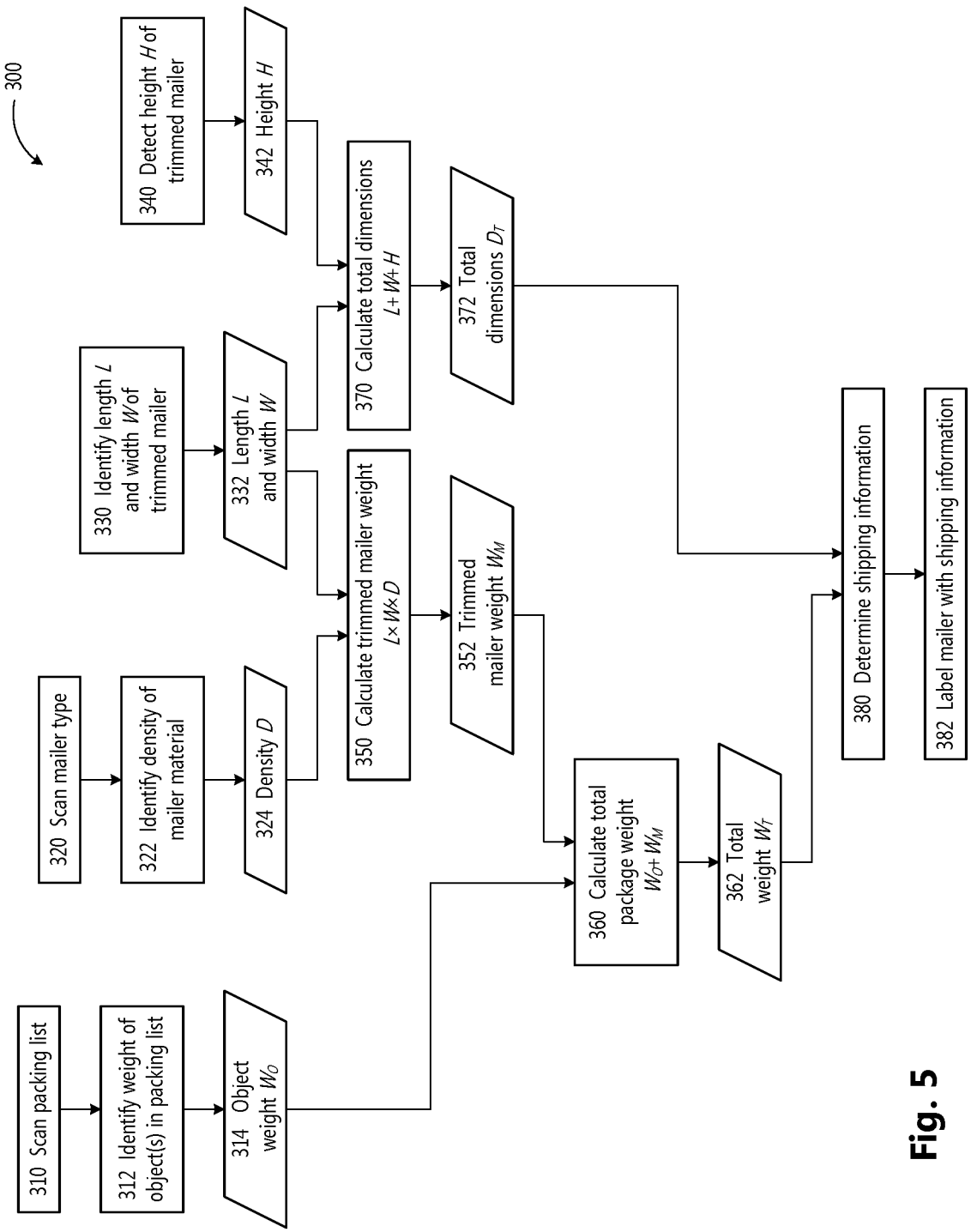
FIG. 5 depicts an embodiment of a method that can be performed by a system that includes a forming funnel, a fusing device, a cutting element to reduce the size of mailers, one or more dimension sensors, one or more scanning devices, and a labelling mechanism, in accordance with the embodiments disclosed herein.

In some embodiments, the system 200 can further prepare the reduced-sized cushioned mailer 130 for shipping after the instance shown in FIG. 4D. In some embodiments, the system 200 can also include one or more dimension sensors configured to determine one or more dimensions of the reduced-size mailers. In some embodiments, the system 200 can also include one or more scanning devices configured to read a machine-readable code (e.g., a barcode, a QR code, etc.) from packing lists, from object packaging, from a mailer, or from any other object. In some embodiments, the system 200 can also include a labelling mechanism configured to print information (e.g., shipping information) on the reduced-size mailers or to apply a printed label (e.g., a shipping label) on the reduced-size mailers. Depicted in FIG. 5 is an embodiment of a method 300 that can be performed by a system that includes a forming funnel, a fusing device, a cutting element to reduce the size of mailers, one or more dimension sensors, one or more scanning devices, and a labelling mechanism.

At block 310, a packing list is scanned. In some embodiments, the packing list is scanned using a scanning device, such as a barcode scanner, a camera, and the like, in the system. In some embodiments, the packing list is a document (e.g., an order printed on a piece of paper) that has a machine-readable code (e.g., a barcode, a QR code, etc.) printed thereon. In some embodiments, the packing list is a SKU (stock keeping unit) on a single product, where the SKU is a machine-readable code. In some embodiments, the packing list is a number of SKUs, each of which is on a different item, where the items have been grouped for packaging (e.g., items placed in a tray by a picker in a warehouse).

At block 312, the weight of one or more objects in the packing list are identified. In some embodiments, scanning the packing list returns an identifier of an order and identifying the weight of the one or more objects includes identifying each of the one or more objects associated with the order and looking up the weight (e.g., in a lookup table) of the one or more objects in the order. In some embodiments, scanning the packing list includes scanning an identifier of each of one or more objects and identifying the weight of the one or more objects includes looking up the weight (e.g., in a lookup table) of the one or more objects. After the weight of the one or more objects is identified in block 312, then, at block 314, the system has the object weight $W_O$ of the packing list.

At block 320, a mailer type is scanned. In some embodiments, the mailer type is an identifier of the type of mailer that a user (e.g., a packer) intends to use to pack the one or more objects. In some embodiments, each of the mailers that can be used to package objects has a machine-readable code, such as a barcode, printed on an exterior surface of the mailer, and scanning the mailer type includes scanning the machine-readable code on the mailer using a scanning device in the system. In some embodiments, a dispenser of the mailers includes a machine-readable code that includes an indication of the type of mailer and scanning the mailer type includes scanning the machine-readable code on the dispenser using a scanning device in the system.

At block 322, the density of the mailer material is identified. In some embodiments, scanning the mailer type returns an identifier of the mailer type and identifying the density of the mailer includes looking up (e.g., in a lookup table) the density of the mailer material based on the identifier of the mailer type. In some embodiments, scanning the mailer type returns an identifier of the mailer type and identifying the density of the mailer includes looking up (e.g., in a lookup table) dimensions and weight of the mailer based on the identifier of the mailer type and calculating the density based on the dimensions and the weight. After the density of the mailer material is identified in block 322, then, at block 324, the system has the density D of the mailer material.

The system may include a cantilevered forming funnel (e.g., the forming funnel 201) to receive a mailer inserted as far as the object(s) in the mailer will permit, a cutting element (e.g., the cutting element 250) to trim the mailer by cutting off a portion of the mailer, and a fusing device (e.g., the fusing device 202) to close the remaining end of the mailer. In this way, a portion of the mailer has been cut away to form the trimmed mailer. The system may also have one or more dimension sensors configured to determine one or more dimensions of the trimmed mailer.

At block 330, a length and a width of the trimmed mailer are identified. In some embodiments, the length and width of the trimmed mailer are identified by a non-contact dimension sensor, such as an image sensor (e.g., a camera) that identifies a grid of features on the mailer and/or a conveyor on which the trimmed mailer is conveyed, a laser scanning sensor, or any other type of non-contact sensor. In some embodiments, the length and width of the trimmed mailer can be identified by calculating an estimated length and width of the trimmed mailer as a function of a known dimension of the mailer from the scanned mailer type (e.g., the mailer width) and a length of the cutoff portion of the mailer sensed by a dimension sensor. In some cases, the estimated length and width can further be a function of the height of the trimmed mailer inside. The length and the width of the trimmed mailer can be determined in any number of other ways. After the length and width of the mailer are identified in block 330, then, at block 332, the system has the length L and the width W of the trimmed mailer.

At block 340, a height of the trimmed mailer is identified. In some embodiments, the height of the trimmed mailer is identified by a non-contact dimension sensor, such as an image sensor, a laser scanning sensor, or any other type of non-contact sensor. In some embodiments, the length and width of the trimmed mailer can be identified by calculating an estimated height of the trimmed mailer as a function of a known dimension of the object from the scanned packing list (e.g., the object height) and a known dimension of the mailer (e.g., a thickness of each side of the mailer. The height of the trimmed mailer can be determined in any number of other ways. After the height of the mailer is identified in block 340, then, at block 342, the system has the height H of the trimmed mailer.

It will be noted that the portions of the method 300 that have been discussed previously can be performed independently of each other. For example, the portion between block 310 and 314, the portion between block 320 and 324, the portion between block 330 and 322, and the portion between block 340 and 342 can be performed in parallel, in series, or in some combination thereof. Each of the portions of the method can be performed by a computing device in the system. In some cases, some of the portions of the method can be performed by the computing device in combination with one or more components of the system (e.g., a dimension sensor, a scanning device).

At block 350, the weight of the trimmed mailer is calculated. In some embodiments, the weight of the trimmed mailer is calculated based on the identified density D of the mailer material and one or more dimensions of the trimmed mailer. In the depicted embodiment, the weight of the trimmed mailer is calculated as a function of the length L of the mailer, the width W of the mailer, and the density D of the mailer material. In this case, the density D of the mailer material is a value of a weight per two-dimensional area, such as grams per square centimeter, pounds per square inch, and the like. In other embodiments, the density D of the mailer material can be a value of a weight per one-dimensional length, such as grams per linear centimeter, pounds per linear inch, and the like. For example, if the width of the mailer does not change when the mailer is trimmed, the weight can be calculated as a function of the trimmed length of the mailer and a density of the mailer material per length of the mailer. In this case, it may be advantageous to determine the length of the trimmed mailer by detecting the length of the cutoff portion of the mailer and subtracting that cutoff length from the known original length of the mailer. In other embodiments, the weight of the trimmed mailer can be calculated in any other way. After the weight of the mailer is calculated in block 350, then, at block 352, the system has the weight $W_M$ of the trimmed mailer.

At block 360, the weight of the total package is calculated. In some embodiments, the total weight of the package is calculated as a function of the weight of the trimmed mailer and the weight of the object(s) in the mailer. In the depicted embodiment, the total weight of the package is calculated by adding the object weight $W_O$ from block 314 and the trimmed mailer weight $W_M$ from block 352. After the weight of the total package is calculated in block 360, then, at block 362, the system has the total weight $W_T$ of the package.

At block 360, the weight of the total package is calculated. In some embodiments, the total weight of the package is calculated as a function of the weight of the trimmed mailer and the weight of the object(s) in the mailer. In the depicted embodiment, the total weight of the package is calculated by adding the object weight $W_O$ from block 314 and the trimmed mailer weight $W_M$ from block 352. After the weight of the total package is calculated in block 360, then, at block 362, the system has the total weight $W_T$ of the package.

At block 370, the total dimensions of the package are calculated. In some embodiments, the total dimensions of the package are calculated as a function of the widest portions of the package in each of three dimensions. In the depicted embodiment, the total dimensions of the package are calculated by adding the mailer length L from block 332, the width W from block 332, and the mailer height H from block 342. After the total dimensions of the package are calculated in block 370, then, at block 372, the system has the total dimensions DT of the package.

It will be noted that the portions of the method 300 from block 350 to block 362 and from block 370 to block 372 can be performed independent of each other. For example, the portion of the method 300 from block 350 to block 362 and the portion of the method 300 from block 370 to block 372 can be performed in parallel or in series. Each of the portions of the method can be performed by a computing device (e.g., a controller) in the system. In some cases, some of the portions of the method can be performed by the computing device in combination with one or more components of the system (e.g., a dimension sensor).

At block 380, shipping information for the package can be determined. The shipping information can include information about the shipment origin, the shipment destination, the shipping carrier, the shipping class (e.g., ground, air, overnight, etc.), a tracking number, a cost of shipping, and the like. In some embodiments, determining the shipping information includes determining an effective shipping weight of the package. In some cases, the effective shipping weight of the package is the greater of the actual weight and the dim weight of the package. To calculate the dim weight, the total dimensions DT of the package from block 372 are multiplied by a minimum effective density (e.g., 1 pound per 144 cubic inches, 1 kilogram per 5,200 cubic centimeters, etc.). The dim weight is then compared to the total weight $W_T$ of the package from block 362, and the effective shipping weight is the greater of the dim weight and the total weight $W_T$. In some cases, the cost of shipping is determined based on the effective shipping weight.

At block 382, the mailer is labelled with shipping information. In some embodiments, the labelling of the mailer is performed by a labelling mechanism of the system. In some embodiments, the labelling mechanism is configured to print the shipping information directly on the mailer. The printing of the shipping information on the mailer may occur before the object(s) are loaded into the mailer or after the object(s) are loaded into the mailer. In some embodiments, the labelling mechanism is configured to print a label that includes the shipping information (e.g., a shipping label) that can be applied to the mailer. The shipping label can be applied to the mailer automatically (e.g., without user intervention) by the labeling mechanism or the shipping label can be applied to the mailer manually by a user (e.g., a packer). After the mailer is labeled with shipping information, the object(s) have been loaded inside the mailer, and the mailer is closed, the package may be ready for shipping.

Figure 6A:
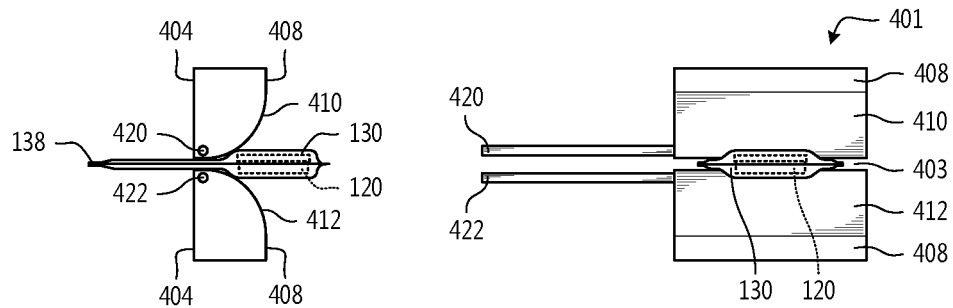
FIGS. 6A to 6C each depict left and front views of an instance of a forming funnel that is usable to fold a mailer after the mailer has been closed to reduce the overall dimensions of the mailer.
Figure 6B:
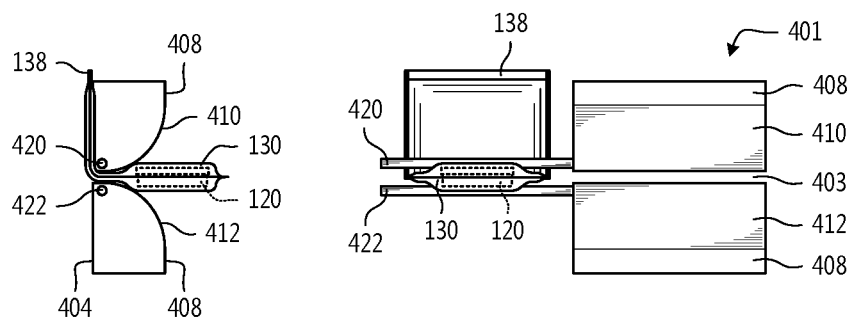
Figure 6C:
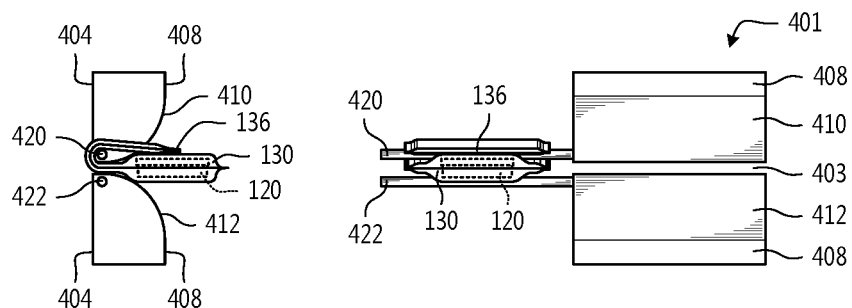

The embodiments described above for reducing the overall dimensions of a mailer include trimming material off the mailer. In other embodiments, the overall dimensions of a mailer can be reduced by folding the mailer. Depicted in each of FIGS. 6A to 6C are left and front views of one instance of a forming funnel 401 that is usable to fold the mailer 130 after the mailer 130 has been closed.

The forming funnel 401 includes a slot 403 that passes through the forming funnel 401. The slot 403 is arranged so that a cushioned mailer is constrained when it is in the slot 403. In this context, the term "constrained" includes a condition where at least a portion of the sides of the mailer is deflected to a position that is different from its natural resting position. In one example, when a cushioned mailer is constrained in the slot 403, the slot 403 deflects one or both sides of the opening to be closer together than they would be if the sides were in their natural resting position. The forming funnel 401 has a back cover 404 that covers portions of the back of the forming funnel 401. The back cover 404 does not cover the back of the slot 403 of the forming funnel 401. As can be seen in FIG. 6A, because the back cover 404 does not cover the slot 403, a cushioned mailer can be inserted into the forming funnel 401 such that a portion of the mailer passes through the slot 403 and is located behind the back cover 404.

In the depicted embodiment, the slot 403 is recessed back from front surfaces 408 of the forming funnel 401. Between the slot 403 and the front surfaces 408, the forming funnel 401 includes an upper divergent surface 410 and a lower divergent surface 412. In the depicted embodiment, each of the upper and lower divergent surfaces 410 and 412 is a contoured surface that is contoured between the vertical surfaces of the front surfaces 408 and the horizontal surfaces of the slot 403. In the depicted embodiment, the upper and lower divergent surfaces 410 and 412 are not parallel to the horizontal surfaces of the slot 403, not parallel to the front surfaces 408, and not parallel to the other surfaces of the upper and lower divergent surfaces 410 and 412. In other embodiments, each of the upper and lower divergent surfaces 410 and 412 may include a single planar surface, any other number of planar surfaces, a contoured surface, any other surface, or any combination thereof. The upper and lower divergent surfaces 410 and 412 allow the slot 403 to be relatively narrow to constrain the sides of a cushioned mailer together.

The forming funnel 401 also includes forming bars 420 and 422. The forming bar 420 extends from the left side of the upper divergent surface 410 and the forming bar 422 extends from the left side of the upper divergent surface 412. The forming bars 420 and 422 are arranged such that there is a gap between the forming bars so that a cushioned mailer can be slid out of the slot 403 in a sliding direction (e.g., from right to left in the front view shown in FIG. 6A) and the cushioned mailer is still located between the forming bars 420 and 422. In the depicted embodiment, the forming bars 420 and 422 have circular cross sections. In other embodiments, the forming bars 420 and 422 can have any other cross-sectional shapes, including an oval, a square, a rectangle, a triangle, an irregular shape, or any other shape.

Depicted in FIG. 6A are side and front views of a first instance of an embodiment of using the forming funnel 401 to reduce the size of the cushioned mailer 130. The opening of the cushioned mailer 130 was closed to form a closed end 138 prior to the first instance shown in FIG. 6A. In one example, the cushioned mailer 130 could have been in the condition shown in FIGS. 2C and 2D before the cushioned mailer 130 was inserted into the forming funnel 401. In FIG. 6A, the closed end 138 of the cushioned mailer 130 has been inserted through the forming funnel 401 such that the closed end 138 of the cushioned mailer 130 is beyond the back cover 404 of the forming funnel 401. The cushioned mailer 130 was inserted into the forming funnel 401 in an insertion direction (e.g., right to left in the side view in FIG. 6A). As the cushioned mailer 130 was inserted into the forming funnel 401 in the insertion direction, the closed end 138 of the cushioned mailer 130 was oriented toward the forming funnel 401 and at least one side of the cushioned mailer 130 contacted at least one of the upper and lower divergent surfaces 210 and 212 to constrain the sides of the cushioned mailer 130.

The cushioned mailer 130 was moved further in the insertion direction until the cushioned mailer 130 was in the position shown in FIG. 6A. At the position shown in FIG. 6A, the object 120 presses portions of the cushioned mailer 130 against the upper and lower divergent surfaces 410 and 412 such that the cushioned mailer 130 is prevented from being moved any further in the insertion direction. At this point in the depicted embodiment, the closed end 138 of the cushioned mailer 130 is located behind the back cover 404 of the forming funnel 401.

Depicted in FIG. 6B are side and front views of a second instance of an embodiment of using the forming funnel 401 to reduce the size of the cushioned mailer 130. From the instance shown in FIG. 6A to the instance shown in FIG. 6B, the cushioned mailer 130 has been slid in a sliding direction (e.g., from right to left in the front view shown in FIGS. 6A and 6B). In the depicted embodiment, the cushioned mailer 130 has also been folded around the forming bar 420 so that the closed end 138 is oriented upward. In other embodiments, the cushioned mailer 130 could also be folded around the forming bar 422 so that the closed end 138 is oriented downward. In some embodiments, the folding of the cushioned mailer 130 is performed by a folding device (not shown). In some embodiments, the folding device is configured to fold the cushioned mailer 130 in response to detection of the cushioned mailer 130 between the forming bars 420 and 422. In some examples, the folding device includes a fixed, angled guide that progressively folds the mailer 130 as the mailer 130 is slid in the sliding direction. In some examples, the folding device includes a movable panel that is configured to fold the mailer 130 while the portion of the mailer 130 with the object 120 is held stationary.

Depicted in FIG. 6C are side and front views of a third instance of an embodiment of using the forming funnel 401 to reduce the size of the cushioned mailer 130. From the instance shown in FIG. 6B to the instance shown in FIG. 6C, the cushioned mailer 130 has been further folded around the forming bar 420 so that the closed end 138 has been folded back onto the top of the cushioned mailer 130. In other embodiments, the cushioned mailer 130 could also be folded around the forming bar 422 so that the closed end 138 has been folded back onto the bottom of the cushioned mailer 130. With the closed end 138 in the position shown in FIG. 6C, the closed end can be fixed to the top of the cushioned mailer 130. This can be done by taping the closed end 138 to the top of the cushioned mailer 130, pressing the closed end 138 against an adhesive on the top of the cushioned mailer 130, stapling the closed end 138 to the cushioned mailer 130, or in any other way that causes the closed end 138 to be fixed with respect to the cushioned mailer 130 in the position shown in FIG. 6C. In some embodiments, the fixing of the closed end 138 to the cushioned mailer 130 is perfumed automatically. For example, a taping machine can be configured to apply tape to the closed end 138 and to the cushioned mailer 130 in response to the folding of the cushioned mailer 130 into the position shown in FIG. 6C.

After the cushioned mailer 130 has been folded into the position shown in FIG. 6C and the closed end 138 has been fixed to the top of the cushioned mailer 130, the cushioned mailer can be further slid in the sliding direction so that the cushioned mailer slides off of the left end of the forming bar 420. With the cushioned mailer 130 folded and the closed end 138 fixed to the top or bottom of the cushioned mailer 130, the cushioned mailer 130 has reduced overall dimensions compared to the cushioned mailer 130 before it was folded. For example, when comparing the length of the cushioned mailer 130 before it was folded in the side view shown in FIG. 6A (e.g., the length of the cushioned mailer 130 from right to left in the side view in FIG. 6A) to the length of the cushioned mailer 130 after it was folded in the side view shown in FIG. 6C, the length of the cushioned mailer 130 in FIG. 6C is clearly shorter. This reduced dimension of the cushioned mailer 130 can lead to reduced dim weight of the mailer and therefore reduced shipping cost of the cushioned mailer 130.

Although not depicted in FIGS. 6A to 6C, the forming funnel 401 can be part of a system that includes one or more components in addition to the forming funnel 401. In some embodiments, the system can include a fusing device configured to close the cushioned mailer 130—forming the closed end 138—before the cushioned mailer is inserted into the forming funnel 401. In some embodiments, the system can include a labelling mechanism configured to print and/or apply a shipping label on the cushioned mailer 130 after the closed end 138 is fixed to top or bottom of the cushioned mailer 130. In some embodiments, the system can include a computing device, such as a controller, configured to control one or more of the folding device as it folds the cushioned mailer 130, a taping mechanism or other fixing device as the closed end 138 is fixed to the top or bottom of the cushioned mailer, a conveyor system as it conveys the cushioned mailer 130, or any other component of the system.

In the embodiments disclosed herein, mailers are described as moving through slots of forming funnels and/or fusing devices. For example, the mailer 130 is shown moving through the slot 203 of the system 200 in FIGS. 4A to 4D. In any embodiment disclosed herein, it will be understood that a mailer moving through a slot includes any respective movement of the mailer and the slot. In one example, the mailer 130 moving through the slot can include the system 200 remaining stationary (e.g., stationary with respect to a user) and the mailer 130 being moved (e.g., moved by the user) to cause the mailer 130 to move through the slot 203. In another example, the mailer 130 moving through the slot can include the mailer 130 remaining stationary (e.g., stationary with respect to a user) and the system 200 being moved (e.g., moved by the user) to cause the mailer 130 to move through the slot 203. In another example, the mailer 130 moving through the slot can include both the mailer 130 and the system 200 being moved (e.g., moved by a user) to cause the mailer 130 to move through the slot 203.

Figure 7:
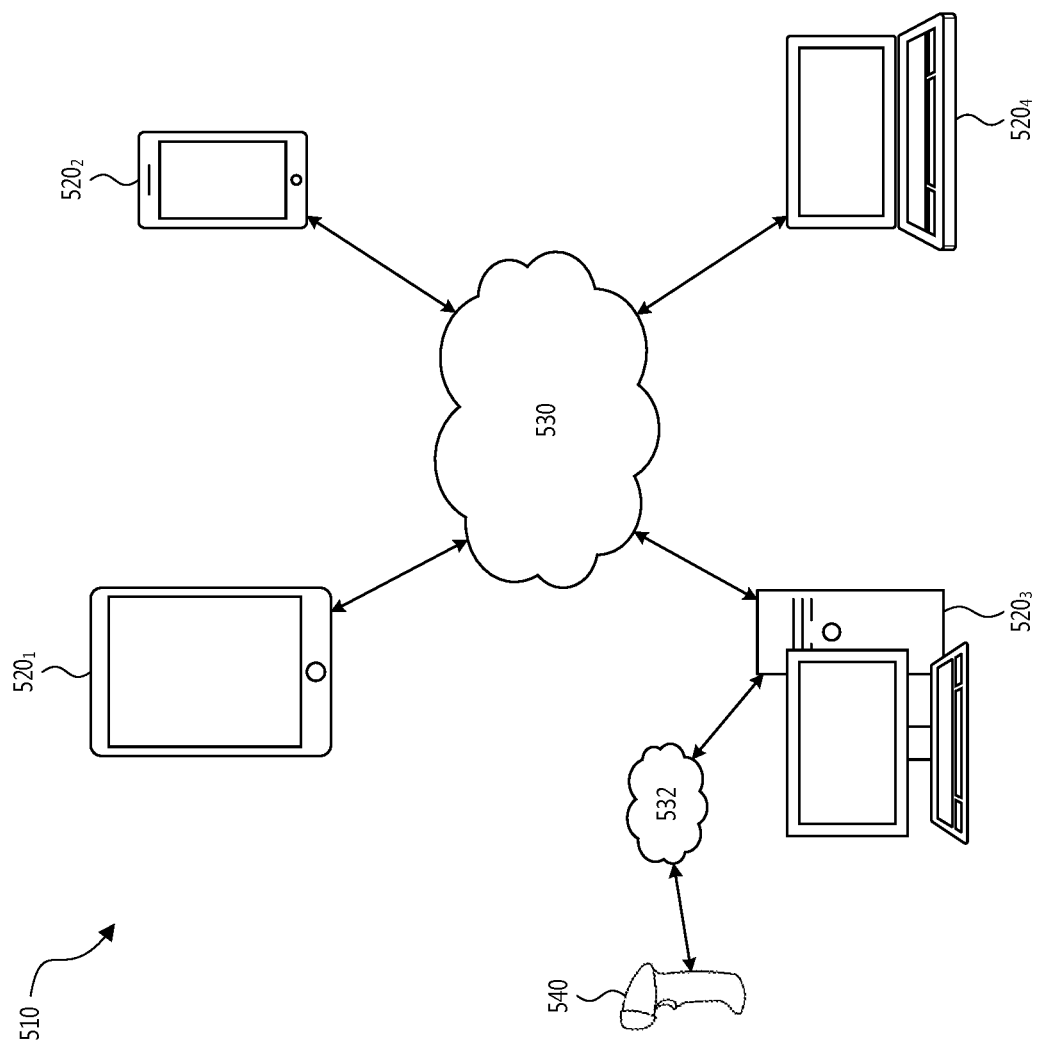
FIG. 7 depicts an example embodiment of a system that may be used to implement some or all of the embodiments described herein.

FIG. 7 depicts an example embodiment of a system 510 that may be used to implement some or all of the embodiments described herein. In the depicted embodiment, the system 510 includes computing devices 5201, 5202, 5203, and 5204 (collectively computing devices 520). In the depicted embodiment, the computing device 5201 is a tablet, the computing device 5202 is a mobile phone, the computing device 5203 is a desktop computer, and the computing device 5204 is a laptop computer. In other embodiments, the computing devices 520 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 520 are communicatively coupled to each other via one or more networks 530 and 532. Each of the networks 530 and 532 may include one or more wired or wireless networks (e.g., a 3G network, the Internet, an internal network, a proprietary network, a secured network). The computing devices 520 are capable of communicating with each other and/or any other computing devices via one or more wired or wireless networks. While the particular system 510 in FIG. 7 depicts that the computing devices 520 communicatively coupled via the network 530 include four computing devices, any number of computing devices may be communicatively coupled via the network 530.

In the depicted embodiment, the computing device 5203 is communicatively coupled with a peripheral device 540 via the network 532. In the depicted embodiment, the peripheral device 540 is a scanner, such as a barcode scanner, an optical scanner, a computer vision device, and the like. In some embodiments, the network 532 is a wired network (e.g., a direct wired connection between the peripheral device 540 and the computing device 5203), a wireless network (e.g., a Bluetooth connection or a WiFi connection), or a combination of wired and wireless networks (e.g., a Bluetooth connection between the peripheral device 540 and a cradle of the peripheral device 540 and a wired connection between the peripheral device 540 and the computing device 5203). In some embodiments, the peripheral device 540 is itself a computing device (sometimes called a "smart" device). In other embodiments, the peripheral device 540 is not a computing device (sometimes called a "dumb" device).

Figure 8:
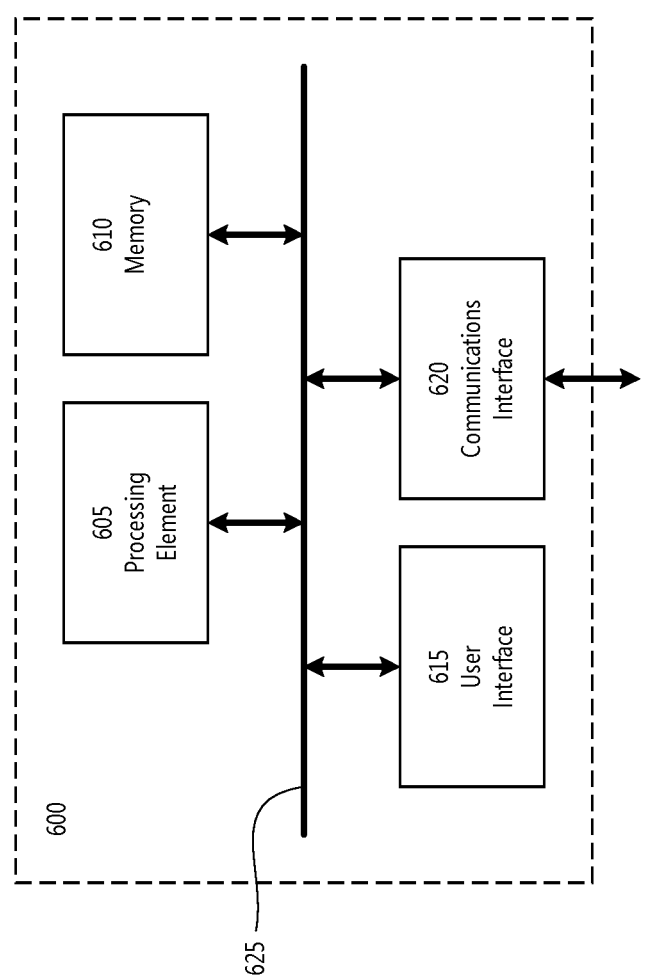
FIG. 8 depicts a block diagram of an embodiment of a computing device, in accordance with the embodiments described herein.

Depicted in FIG. 8 is a block diagram of an embodiment of a computing device 600. Any of the computing devices 520 and/or any other computing device described herein may include some or all of the components and features of the computing device 600. In some embodiments, the computing device 600 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 600 includes a processing element 605, memory 610, a user interface 615, and a communications interface 620. The processing element 605, memory 610, a user interface 615, and a communications interface 620 are capable of communicating via a communication bus 625 by reading data from and/or writing data to the communication bus 625. The computing device 600 may include other components that are capable of communicating via the communication bus 625. In other embodiments, the computing device does not include the communication bus 625 and the components of the computing device 600 are capable of communicating with each other in some other way.

The processing element 605 (also referred to as one or more processors, processing circuitry, and/or similar terms used herein) is capable of performing operations on some external data source. For example, the processing element may perform operations on data in the memory 610, data receives via the user interface 615, and/or data received via the communications interface 620. As will be understood, the processing element 605 may be embodied in a number of different ways. In some embodiments, the processing element 605 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 605 is configured for a particular use or configured to execute instructions stored in volatile or nonvolatile media or otherwise accessible to the processing element 605. As such, whether configured by hardware or computer program products, or by a combination thereof, the processing element 605 may be capable of performing steps or operations when configured accordingly.

The memory 610 in the computing device 600 is configured to store data, computer-executable instructions, and/or any other information. In some embodiments, the memory 610 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 610 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 615 of the computing device 600 is in communication with one or more input or output devices that are capable of receiving inputs into and/or outputting any outputs from the computing device 600. Embodiments of input devices include a keyboard, a mouse, a touchscreen display, a touch sensitive pad, a motion input device, movement input device, an audio input, a pointing device input, a joystick input, a keypad input, peripheral device 540, foot switch, and the like. Embodiments of output devices include an audio output device, a video output, a display device, a motion output device, a movement output device, a printing device, and the like. In some embodiments, the user interface 615 includes hardware that is configured to communicate with one or more input devices and/or output devices via wired and/or wireless connections.

The communications interface 620 is capable of communicating with various computing devices and/or networks. In some embodiments, the communications interface 620 is capable of communicating data, content, and/or any other information, that can be transmitted, received, operated on, processed, displayed, stored, and the like. Communication via the communications interface 620 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 620 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 600 may be located remotely from other components of the computing device 600 components, such as in a distributed system. Furthermore, one or more of the components may be combined and additional components performing functions described herein may be included in the computing device 600. Thus, the computing device 600 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:
    a forming funnel comprising divergent surfaces arranged to receive a mailer in an insertion direction between the divergent surfaces, wherein the forming funnel includes a slot configured to constrain the mailer after the mailer is inserted between the divergent surfaces;
    a cutting element configured to cut off a portion of the mailer and to form a cut end of the mailer as the mailer is moved through the slot in a sliding direction; and
    a fusing device configured to apply pressure to an exterior of the cut end of the mailer as the mailer is moved through the slot and to apply heat to the cut end of the mailer as the mailer is moved through the slot, wherein the pressure and the heat applied by the fusing device cause portions of the cut end to fuse together to close the mailer.

2. The system of claim 1, wherein the insertion direction is substantially perpendicular to the sliding direction.

3. The system of claim 1, wherein the fusing device further comprises:
    a first set of rollers on a first side of the slot, wherein the first set of rollers is configured to contact a first side of the exterior of the cut end of the mailer as the cut end of the mailer is moved through the slot; and
    a second set of rollers on a second side of the slot, wherein the second set of rollers is configured to contact a second side of the exterior of the cut end of the mailer as the cut end of the mailer is moved through the slot;
    wherein the first and second sets of rollers are configured to apply the pressure to the exterior of the cut end of the mailer.

4. The system of claim 3, wherein the fusing device further comprises:
    a conveying system configured to convey the cut end of the mailer through the at least a portion of the slot that includes the first and second sets of rollers.

5. The system of claim 4, wherein the conveying system includes a continuous band arranged to pass along the first set of rollers.

6. The system of claim 5, further comprising a driving system configured to drive the continuous band.

7. The system of claim 6, wherein the mailer is configured to be inserted into the forming funnel manually and moved in the sliding direction manually until the cut end of the mailer reaches the continuous band, and wherein the driving of the continuous band moves the mailer in the sliding direction through the first and second sets of rollers.

8. The system of claim 3, wherein the exterior of the cut end of the mailer include a first ply of paper on the first side of the exterior of the cut end and a second ply of paper on the second side of the exterior of the cut end, wherein an inner surface of each of the first and second plies of paper has an air cellular material adhered thereto.

9. The system of claim 8, wherein the pressure and the heat applied to the cut end of the mailer causes at least a portion of the air cellular material on the first ply of paper to fuse with at least a portion of the air cellular material on the second ply of paper.

10. The system of claim 8, wherein the portions of the cut end fused together to close the mailer include a heat seal in the air cellular material on the first and second plies of paper, wherein the heat seal is formed by the pressure and the heat applied by the fusing device.

11. The system of claim 1, wherein the fusing device further comprises:
    an upper heating element configured to apply heat to an upper side of the cut end of the mailer; and
    a lower heating element configured to apply heat to a lower side of the cut end of the mailer.

12. The system of claim 11, wherein the fusing device further comprises:
    an upstream set of nip rollers located upstream of the upper and lower heating elements, wherein the upstream set of nip rollers are configured to apply pressure to the cut end of the mailer before the cut end of the mailer passes between the upper and lower heating elements; and
    a downstream set of nip rollers located downstream of the upper and lower heating elements, wherein the downstream set of nip rollers are configured to apply pressure to the cut end of the mailer after the cut end of the mailer passes between the upper and lower heating elements.

13. The system of claim 1, further comprising a back cover, wherein the back cover covers portions of a back of the forming funnel, and wherein the back cover does not cover the slot in the forming funnel.

14. The system of claim 13, wherein the back cover covers portions of the slot in the fusing device.

15. The system of claim 1, further comprising:
a labelling mechanism configured to apply a shipping label to the mailer after the portion of the mailer has been cut off by the cutting element.

16. The system of claim 15, wherein the shipping includes shipping information based on dimensions of the mailer after the portion of the mailer has been cut off by the cutting element.

17. A method of preparing a mailer for shipment, the method comprising:
receiving, into a slot of a forming funnel, a mailer that has an object placed therein, wherein the mailer is capable of being inserted through the slot until a size of the object prevents the mailer from being further inserted through the slot;
cutting off, by a cutting element as the mailer is slid through the slot in a sliding direction, a portion of the mailer to form a trimmed mailer having a cut end;
closing, by a fusing device, the cut end of the trimmed mailer as the trimmed mailer is further slid through the slot in the sliding direction;
identifying, by a computing device, one or more dimensions of the trimmed mailer;
determining, by a computing device, shipping information for the trimmed mailer, wherein the shipping information is determined based on the identified one or more dimensions of the trimmed mailer; and
printing or applying, by a labelling mechanism, the shipping information on the trimmed mailer.

18. The method of claim 17, further comprising:
scanning, by a scanning device, an identifier of a packing list; and
identifying, by the computing device, a weight of the objected based on the identifier of the packing list.

19. The method of claim 18, further comprising:
scanning, by a scanning device, an identifier of a mailer type of the mailer;
identifying, by the computing device, a density of the mailer based the identifier of the packing list; and
calculating a weight of the trimmed mailer based on the density of the mailer and the identified one or more dimensions of the trimmed mailer.

20. The method of claim 19, further comprising:
calculating, by the computing device, a weight of a package that includes the object and the trimmed mailer based on the weight of the object and the weight of the trimmed mailer.

21. The method of claim 20, further comprising:
sensing, by a dimension sensor, a height of the trimmed mailer; and
calculating, by the computing device, total dimensions of the trimmed mailer based on the sensed height of the trimmed mailer and the identified one or more dimensions of the trimmed mailer.

22. The method of claim 21, further comprising:
calculating, by the computing device, a dim weight of the trimmed mailer based on the total dimensions of the trimmed mailer.

23. The method of claim 22, wherein determining the shipping information includes comparing the weight of the package to the dim weight of the trimmed mailer.

* * * * *